United States Patent
Durham et al.

(10) Patent No.: US 9,514,285 B2
(45) Date of Patent: Dec. 6, 2016

(54) CREATING STACK POSITION DEPENDENT CRYPTOGRAPHIC RETURN ADDRESS TO MITIGATE RETURN ORIENTED PROGRAMMING ATTACKS

(71) Applicant: Intel Corporation, Santa Clara, CA (US)

(72) Inventors: David M. Durham, Beaverton, OR (US); Baiju V. Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/498,521

(22) Filed: Sep. 26, 2014

(65) Prior Publication Data
US 2016/0094552 A1 Mar. 31, 2016

(51) Int. Cl.
G06F 21/54 (2013.01)
G06F 21/00 (2013.01)

(52) U.S. Cl.
CPC .................... *G06F 21/00* (2013.01)

(58) Field of Classification Search
CPC ............................ H04L 63/0876; G06F 21/54
USPC .................................................. 713/171, 190
See application file for complete search history.

(56) References Cited

U.S. PATENT DOCUMENTS 7,853,803 B2 * 12/2010 Milliken ................. G06F 21/52
   713/176
2014/0173293 A1 * 6/2014 Kaplan ................... G06F 21/54
   713/190

OTHER PUBLICATIONS

"Disk encryption theory," available at http://en.wikipedia.org/wiki/XEX-TCB-CTS, accessed Dec. 29, 2014, 6 pages.
"The Heartbleed bug", available at http://heartbleed.com/, accessed Dec. 29, 2014, 7 pages.
"OpenSSL," available at http://en.wikipedia.org/wiki/OpenSSL, accessed Dec. 29, 2014, 13 pages.
"Return-oriented programming," available at http://en.wikipedia.org/wiki/Return-oriented_programming, accessed Dec. 29, 2014, 4 pages.
"Buffer overflow," available at http://en.wikipedia.org/wiki/Buffer_overflow, accessed Dec. 29, 2014, 12 pages.

* cited by examiner

*Primary Examiner* — Jacob Lipman
(74) *Attorney, Agent, or Firm* — Barnes & Thornburg LLP (57) ABSTRACT

A computing device includes technologies for securing return addresses that are used by a processor to control the flow of execution of a program. The computing device uses a cryptographic algorithm to provide security for a return address in a manner that binds the return address to a location in a stack.

23 Claims, 7 Drawing Sheets

CREATING STACK POSITION DEPENDENT CRYPTOGRAPHIC RETURN ADDRESS TO MITIGATE RETURN ORIENTED PROGRAMMING ATTACKS

BACKGROUND

When a software application runs on a computing device, a processor executes machine-level instructions into which high level programming code of the application has been translated (e.g., by a compiler and/or an interpreter, etc.). The pre-defined set of machine-level instructions that a particular processor can execute is the processor's instruction set. The processor typically fetches from memory, sequentially, the machine-level instructions corresponding to the functionality of a software application, and then executes the instructions sequentially.

However, the processor may encounter an instruction that transfers control of the program execution to another instruction or set of instructions stored in another memory location. For example, a call instruction causes the processor to transfer control of the program execution to a subroutine, such as a function or a procedure. In this case, the called subroutine will have among its instructions at least one return ("ret") instruction. The return instruction causes the processor to return control back to the instruction that immediately follows the call instruction in the normal sequence of instructions. The memory location of the instruction to which control should return after a call instruction may be referred to as the return address. Some examples of control transfer instructions include call, jump ("jmp"), interrupt ("int"), and return from interrupt ("iret").

The processor uses a call stack data structure to keep track of the program control flow when a call instruction is encountered. To do this, the call instruction pushes the return address onto the top of the stack. A stack pointer is used to keep track of the memory location of the top of the stack. The stack pointer is stored in a processor register. The return instruction uses the stack pointer to retrieve the return address from the top of the stack. The return instruction transfers control to the instruction found at the memory location of the return address.

Return-oriented programming (ROP) refers to a category of computer security exploits that allow an attacker to take control of the call stack and redirect the program flow to malicious code. A ROP attack may be enabled by a buffer overflow. A buffer overflow may occur, for example, as a result of a bug in an application program. When the buffer overflow occurs, the return address on the call stack may be overwritten with a different memory address. When this occurs, program flow can be diverted to an address at which an attacker's code (which may be referred to as a "gadget") is located. Gadgets can be chained together to perform a series of functions that provide useful information to the attacker. Another example of a ROP attack is the stack pivoting exploit, which exposed vulnerabilities in some versions of the ADOBE ACROBAT and ADOBE READER software applications that allowed the stack pointer register to be manipulated by an adversary. This allowed the adversary to redirect the stack location in memory to a portion of the memory heap controlled by the adversary, effectively creating an alternative malicious stack. This attack was designed to trick users into clicking on a malicious PDF file delivered in an email message.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
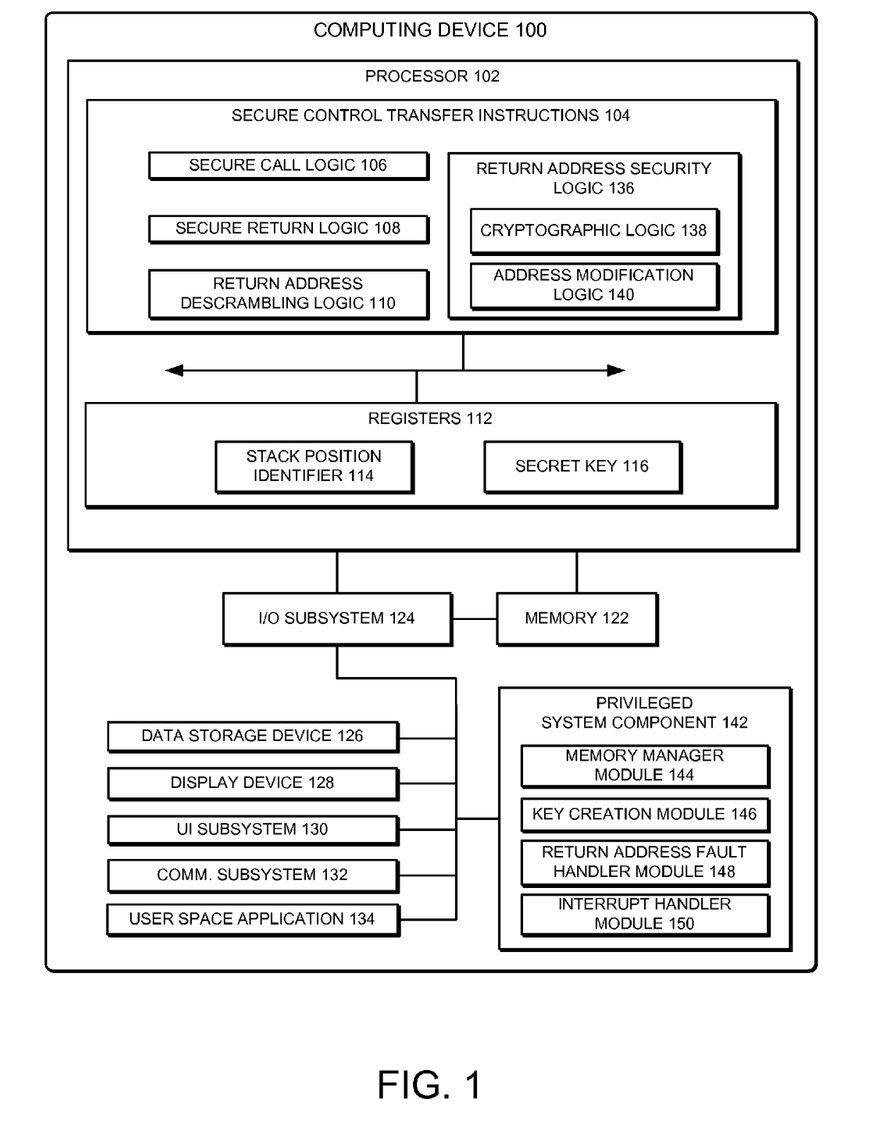
FIG. 1 is a simplified block diagram of at least one embodiment of a computing device configured with secure control transfer instructions as disclosed herein.

Referring now to FIG. 1, an embodiment of a computing device 100 includes a processor 102 and a set of secure control transfer instructions 104. The illustrative secure control transfer instructions 104 are embodied as, for example, processor instructions (e.g., in hardware, as part of the processor instruction set architecture), or microcode (e.g., instructions that are stored in read-only memory and executed directly by the processor 102). In other embodiments, portions of the secure control transfer instructions 104 may be embodied as hardware, firmware, software, or a combination thereof (e.g., as programming code executed by a privileged system component 142 of the computing device 100). The secure control transfer instructions 104 are executable by the computing device 100 to provide security for return addresses "inline," e.g., during execution of a program (such as a user space software application) by the computing device 100. As used herein, "return address" may refer to, among other things, a location in memory (e.g., a memory address) of an instruction following a "call" or a similar control transfer instruction. The return address indicates the location of the instruction to which program execution is returned by a "return" or similar control transfer instruction. The return address may be referred to by other terminology, such as "return vector," in some embodiments. As used herein, "control transfer instruction" may refer to, among other things, a call, return, jump, interrupt, return from interrupt, or similar instruction that causes the processor 102 to direct program execution to another instruction or group of instructions stored in another portion of memory (e.g., a subroutine, procedure, function, method or program, or more generally, a "callable unit").

The secure control transfer instructions 104 include secure call logic 106, secure return logic 108, and return address descrambling logic 110, each of which utilizes a stack position identifier 114, a secret key 116, and return address security logic 136 (including cryptographic logic 138 and address modification logic 140), to secure and verify return addresses at the control transfer instruction level, as described in more detail below. While shown as a separate block in FIG. 1, it should be understood that portions of the return address security logic 136 may be embodied directly in the secure call logic 106, the secure return logic 108, and the return address descrambling logic 110.

The illustrative secret key 116 is generated by a key creation module 146 of a privileged system component 142 and stored in a memory location that is readable by the processor 102 (e.g., a special purpose register or machine specific register (MSR)). In some embodiments, the secret key 116 may be stored in a location that is readable only by the processor. In other embodiments, the secret key 116 used to secure return addresses can be stored in another memory location, such as in firmware, in a secure portion of the data storage device 126 or another data storage device, or another form of memory suitable for performing the functions described herein. In some embodiments, the secret key 116 may be transmitted across a secure communications channel and restored by an executive (such as an operating system or a virtual machine monitor, e.g., the privileged system component 142 described below). In virtualized environments in which virtual machines are migrated from one machine to another, and/or in cases in which a virtual machine, process or program running on the computing device 100 begins a sleeping/hibernating mode after a return address is secured using the secret key 116, and then later resumes, the secret key 116 will need to be recovered and restored. In these cases, the secret key 116 can be stored or possibly transmitted across a (secure) communications channel prior to a sleeping/hibernating mode, and then retrieved/restored by an executive (such as an operating system or a virtual machine monitor, e.g., the privileged system component 142).

The privileged system component 142 may be embodied as, for example, an operating system kernel or a privileged component of a virtual machine monitor (e.g., an "executive"). If the secure control transfer instructions 104 are not able to properly verify a return address, a fault is raised. A return address fault handler module 148 of the privileged system component 142 handles the fault by, for example, causing execution of the program to stop or taking some other action to prevent an attacker's code from exploiting a security vulnerability in the running application. In this way, the secure control transfer instructions 104 enable the computing device 100 to provide return address security against return oriented programming attacks and similar exploits. In comparison to other approaches, embodiments of the disclosed return address security technologies can operate without adding any additional instructions, memory protections, or memory requirements (e.g., no shadow stack or canary values are needed), and without adding any additional memory reads or writes. Additionally, some embodiments of the disclosed technologies utilize aspects of the address modification logic 140 and the return address fault handler module 148 to support legacy code compatibility, as described below. As used herein, "legacy code" may refer to a version of computer code that was designed to work on an earlier, or now-obsolete, or no-longer-supported computer architecture. For example, legacy code may include software that was originally developed for a 32-bit processor, but which is now running on a 64-bit processor.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the illustrative computing device 100 includes at least one processor 102 embodied with the secure control transfer instructions 104.

As described in more detail below, the illustrative secure call logic 106 performs security computations for return addresses before storing the return addresses on the call stack 218. To do this, the secure call logic 106 executes a portion of cryptographic logic 138 using at least the stack position identifier 114 and the secret key 116 as inputs. The cryptographic logic 138 executes any cryptographic algorithm capable of performing the functions described herein. For example, the cryptographic logic 138 may be implemented using a message authentication algorithm, an exclusive-OR (XOR) operation, a hash algorithm, or an encryption algorithm, including a lightweight block cipher such as SIMON, SPECK or SERPENT, or a strong encryption algorithm such as AES. Some embodiments of the secure call logic 106 also use the return address itself as an input to the cryptographic logic 138, in addition to the stack position identifier 114 and the secret key 116. For example, some embodiments of the secure call logic 106 encrypt the return address using the stack position identifier 114 as a tweak for a tweakable block cipher, such as XOR-encrypt-XOR (XEX), Liskov, Rivest, and Wagner (LRW), or XEX-based tweaked-codebook mode with ciphertext stealing (XTS). Other embodiments of the secure call logic 106 encrypt the stack position identifier 114 and then combine the encrypted stack position identifier 114 with the return address (using, e.g., XOR or other methods as used with counter mode). Some embodiments of the secure call logic 106 further modify the return address by executing the address modification logic 140. The address modification logic 140 manipulates at least a portion of the return address (or the cryptographically-processed return address, as the case may be) so that the return address (or the cryptographically-processed return address, as the case may be) falls within an unused or non-canonical memory region of virtual memory. Manipulating the return address in this way acts as a "signal" to other instructions (such as the secure return logic 108 and the return address descrambling logic 110) that the return address has been secured, rather than corrupted or otherwise compromised, e.g., by an attacker's code. Depending on the cryptographic method used by the secure call logic 106 to secure the return address, the secure call logic 106 outputs either an integrity check value (such as a message authentication code or a secure hash) or a modified version of the return address. However, regardless of which cryptographic technique is used, the output of the secure call logic 106 produces a return address that is bound to a specific location (e.g., a specific address or range of memory addresses) in the call stack 218. As a result, an adversary's attempt to move the return address to another location in the linear address space (e.g., by a stack pivot or maliciously constructed alternative stack) will not be successful.

The secure return logic 108 obtains return addresses from the call stack 218 and verifies them before returning program execution to the instruction stored at the return address. The implementation of the secure return logic 108 depends on the method used by the secure call logic to secure the return address. For example, if the secure call logic 106 secures the return address by storing an integrity check value in an unused memory location, the secure return logic 108 verifies the return address obtained from the call stack 218 by recomputing the integrity check value and comparing the current integrity check value with the integrity check value previously computed by the secure call logic 106. If the two integrity check values do not match, the return address is not successfully verified by the secure return logic 108 and a fault is raised. If the integrity check values match, the secure return logic 108 returns program execution to the instruction located at the return address and program execution continues normally.

If the secure call logic 106 secures the return address by encrypting at least a portion of the return address, the secure return logic 108 verifies the return address by decrypting the encrypted portion of the return address. If the return address is not decrypted successfully, a random memory address results, which value is uncontrollable by the adversary, and likely raising a fault or causing a program crash. If the return address is successfully decrypted, the secure return logic 108 returns program execution to the instruction located at the return address and program execution continues normally. If the secure call logic 106 further modifies the return address by manipulating the return address to fall within an unused range of memory, the secure return logic 108 manipulates the decrypted return address to restore the return address to its original form and then returns program execution to the instruction located at the return address, and program execution continues normally. The return address descrambling logic 110 handles the legacy code situation in which a fault is raised because legacy code has tried to jump to a return address that has been cryptographically modified (e.g., as a result of legacy code using a jump instruction instead of a return). When this situation occurs, the jump instruction naturally causes a fault, because the return address is invalid (e.g., the return address falls within a faulting memory range or a non-canonical address range). As a result, the return address descrambling logic 110 checks to see if the return address that caused the fault falls within the designated unused or non-canonical range of memory, and treats the fault as a "real" fault if the return address that caused the fault does not fall within the unused/non-canonical range. In cases in which legacy code uses a return vector to access memory (e.g., data accesses such as with a MOV instruction), the legacy code obtains a return address from the stack. The legacy code therefore knows the relative location of data in the compiled program (relative to a call instruction). Accordingly, the legacy code may use the position of the data in the compiled program (relative to the call instruction) as a relative offset to the data, e.g., by adding or subtracting a known offset to the return vector address. In this way, legacy code can use the return address for both control flow changes and data accesses. However, in some cases, if the stack pointer is not current, a fault handler may have to scan the stack searching for the modified return address value to determine the stack location, if the address value, or portion thereof, needs to be properly decrypted.

Referring still to FIG. 1, the computing device 100 also includes memory 122, an input/output subsystem 124, a data storage device 126, a display device 128, a user interface (UI) subsystem 130, a communication subsystem 132, at least one user space application 134, and the privileged system component 142 (which, illustratively, includes a memory manager module 144, the key creation module 146, the return address fault handler module 148, and an interrupt handler module 150). The computing device 100 may include other or additional components, such as those commonly found in a mobile and/or stationary computers (e.g., various sensors and input/output devices), in other embodiments. Additionally, in some embodiments, one or more of the illustrative components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a multi-core processor or other multiple-CPU processor or processing/controlling circuit. The processor 102 has a number of registers 112, which include general purpose registers and special purpose registers. The stack position identifier 114 and the secret key 116 are stored in registers 112 (e.g., special purpose registers). The memory 122 of the computing device 100 may be embodied as any type of volatile or non-volatile memory or data storage capable of performing the functions described herein. In operation, the memory 122 may store various data and software used during operation of the computing device 100, including a call stack 218 as described below, as well as operating systems, applications, programs, libraries, and drivers.

The memory 122 is communicatively coupled to the processor 102, e.g., via the I/O subsystem 124. The I/O subsystem 124 may be embodied as circuitry and/or components to facilitate input/output operations with the processor 102, the memory 122, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 122, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth®, Wi-Fi®, WiMAX, 3G/LTE, etc.) to effect such communication. The communication subsystem 132 may be embodied as a network adapter, including a wireless network adapter.

The illustrative computing device 100 also includes a number of computer program components, such as the user space application 134 and the privileged system component 142. The user space application 134 may be embodied as any computer application (e.g., software, firmware, hardware, or a combination thereof) that interacts directly or indirectly with an end user via, for example, the display device 128 or the UI subsystem 130. Some examples of user space applications 134 include word processing programs, document viewers/readers, web browsers, electronic mail programs, messaging services, computer games, camera and video applications, etc. Among other things, the privileged system component 142 facilitates the communication between the user space applications 134 and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, portion of the privileged system component 142 may be embodied as any type of virtual machine monitor capable of performing the functions described herein (e.g., a type I or type II hypervisor).

The illustrative privileged system component 142 includes a number of computer program components, such as the memory manager module 144, the key creation module 146, the return address fault handler module 148, and an interrupt handler module 150. Each of the components of the privileged system component 142 may be embodied as software, firmware, hardware, or a combination of software and hardware. For example, the components of the privileged system component 142 may be embodied as modules of an operating system kernel, a virtual machine monitor, or a hypervisor.

The memory manager module 144 allocates portions of memory 122 to the various processes running on the computing device 100 (e.g., as ranges of virtual memory addresses). As part of the return address security technologies disclosed herein, some embodiments of the memory manager module 144 execute directives to declare portions of linear memory as "unused" (e.g., so no executable code can be stored in that linear range). In some embodiments, such as processors having greater than 32-bit register sizes, unused memory ranges are referred to as "non-canonical" ranges of memory, while "used" portions are referred to as "canonical" ranges. The secure control transfer instructions 104 can utilize the unused/non-canonical ranges of memory to, for example, store and retrieve integrity check values (such as message authentication codes or hash values) or to store and retrieve modified versions of return addresses pushed onto a call stack (e.g., call stack 218, shown in FIG. 2). As described in more detail below, modified versions of return addresses include encrypted or otherwise obfuscated versions of the return addresses.

The key creation module 146 creates the secret key 116 and writes it to a register to which the processor 102 has read access (e.g., a special purpose register). To create the secret key 116, the key creation module 146 may execute, for example, a random number generator or another algorithm capable of generating a secret key that can perform the functions described herein. The return address fault handler module 148 is used in some embodiments to handle faults that occur as a result of a failed verification of the return address by the secure return logic 108. The illustrative return address fault handler module 148 includes logic that allows the secure control transfer instructions 104 to accommodate legacy code, as described below. An example of a legacy code situation that can be handled by the return address fault handler module 148 is where the legacy code issues a call (or similar) instruction, but then uses a jump (or similar) instruction instead of a return instruction. In this situation, the secure return logic 108 is bypassed by the jump instruction and thus, unable to decode the modified return address. As a result, a page fault may occur. In response to the page fault, the return address fault handler module 148 executes return address descrambling logic 110 to verify that the address to which the legacy code is attempting to jump is valid. The interrupt handler module 150 may be embodied as, for example, a standard interrupt handler. The interrupt handler module 150 handles faults when the return address fault handler module 148 is unable to verify the return address causing the fault (e.g., the fault is not the result of a legacy code implementation issue).

Figure 3:
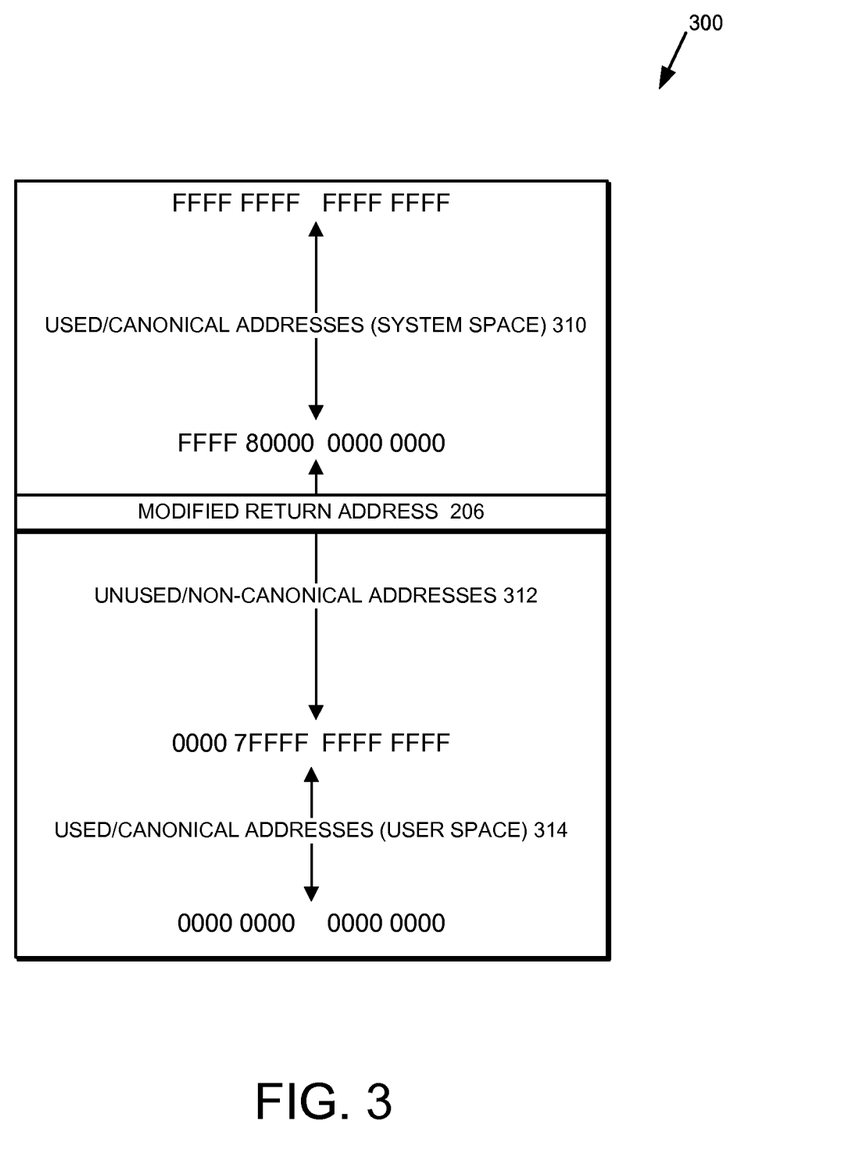
FIG. 3 is a simplified schematic diagram of a range of memory addresses including used and unused addresses.

FIG. 3 illustrates a range of memory addresses 300 that may be allocated by the memory manager module 144, with a modified return address 206 stored in an unused or "non-canonical" range 312 within the address range 300. The illustrative address range 300 also includes used or "canonical" ranges 310 and 314, where the range 310 is declared used by system space programs (such as an operating system or virtual machine monitor), and the range 314 is declared used by user space programs (such as interactive software applications).

Figure 2:
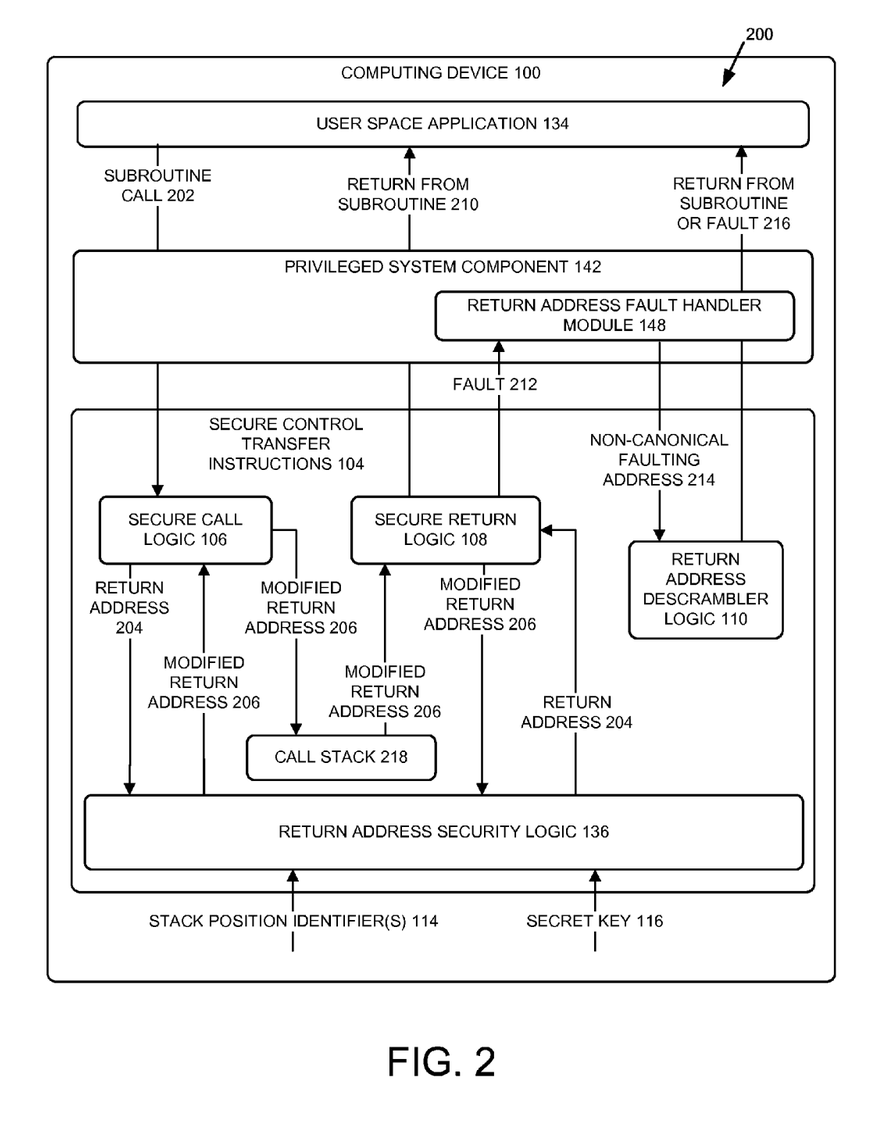
FIG. 2 is a simplified environment diagram of the computing device of FIG. 1, illustrating an application of the secure control transfer instructions of FIG. 1.

Referring now to FIG. 2, in some embodiments, the computing device 100 establishes an environment 200 during operation (e.g., native and/or virtual runtime or "execution" environments). The various modules depicted in the environment 200 may be embodied as hardware, firmware, software, or a combination thereof. In the environment 200, the user space application 134 may, from time to time, during the operation of the computing device 100, issue a subroutine call 202. The subroutine call 202 may be translated (e.g., compiled or interpreted), as needed, by the privileged system component 142 before being passed on to the processor 102. In the processor 102, the secure call logic 106 of the secure control transfer instructions 104 is executed in response to the subroutine call 202 (e.g., in place of conventional "call" logic). Whereas conventional call logic simply places a return address 204 specified by the subroutine call 202 onto a call stack 218, the secure call logic 106 executes a portion of the return address security logic 136 to modify, obfuscate or otherwise secure the return address 204. As shown in FIG. 2, some embodiments of the secure call logic 106 create a modified return address 206, and then store the modified return address 206 onto the call stack 218. The illustrative call stack 218 is embodied as a stack (e.g., first-in, first-out or FIFO) data structure in memory 122.

During execution of the subroutine called by the subroutine call 202, the processor 102 may encounter a return instruction. In response to the return instruction, the processor 102 executes the secure return logic 108. Whereas a conventional return instruction would simply obtain the return address from the call stack 218, some embodiments of the secure return logic 108 utilize a portion of the return address security logic 136 to verify the return address obtained from the call stack 218 (e.g., the modified return address 206), before jumping to the instruction located at the return address 204. If the secure return logic 108 is able to successfully verify the return address 204, the processor 102 returns from the subroutine as normal (210). If the secure return logic 108 is unable to verify the return address 204, the processor 102 raises a fault 212. In some embodiments, the fault 212 is handled by the return address fault handler module 148. To handle the fault 212, the return address fault handler module 148 may determine that the address 214 of the instruction causing the fault is within the unused or non-canonical memory range (e.g., range 312 of FIG. 3). If the address 214 is within the unused/non-canonical range, the return address descrambling logic 110 verifies the modified return address 206 and causes the processor 102 to return from the subroutine and proceed to the next instruction (if the verification is successful), or generate a fault (if the verification is not successful) (216).

Figure 4:
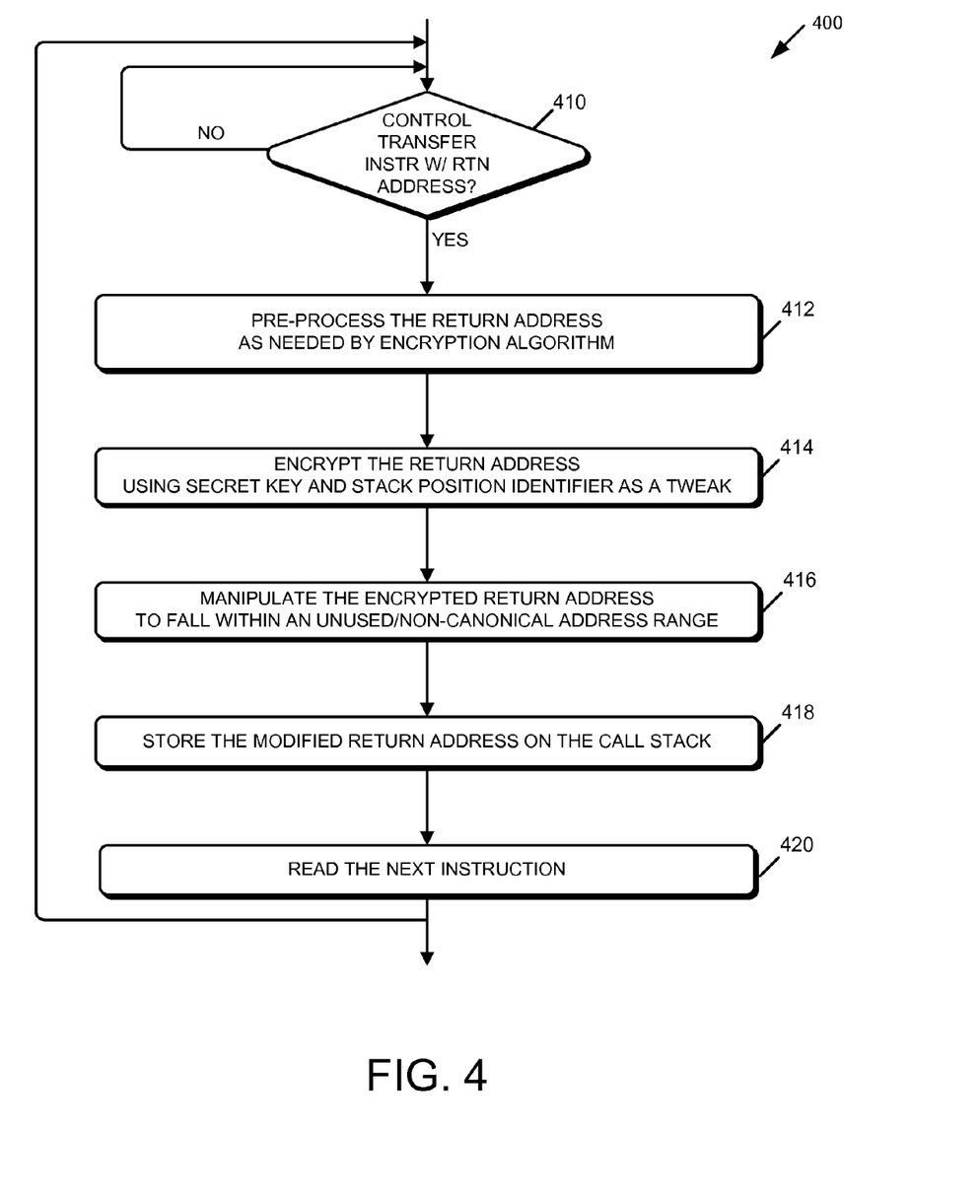
FIG. 4 is a simplified flow diagram of at least one embodiment of a method for providing security for a control transfer instruction as disclosed herein, which may be executed by the computing device of FIG. 1.
Figure 5:
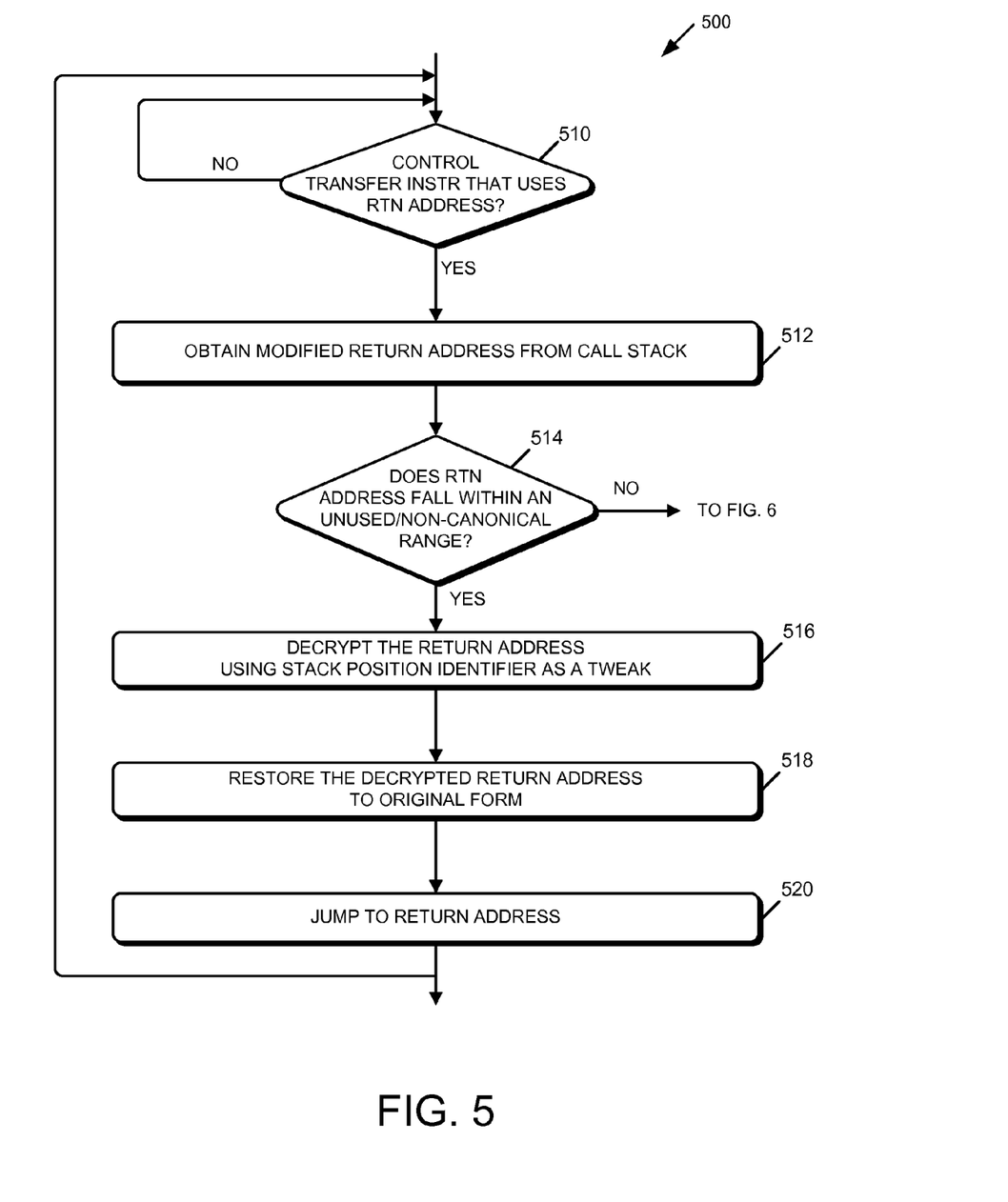
FIG. 5 is a simplified flow diagram of at least one embodiment of a method for providing security for another control transfer instruction as disclosed herein, which may be executed by the computing device of FIG. 1.
Figure 6:
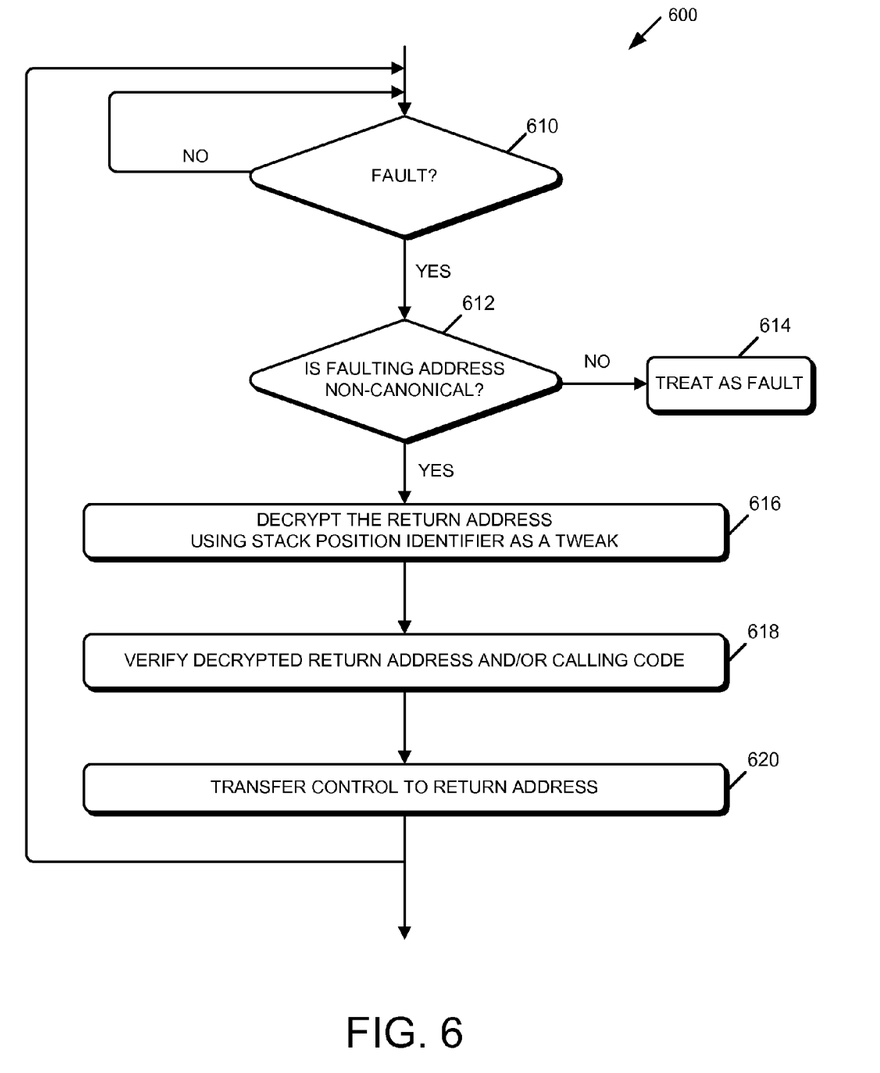
FIG. 6 is a simplified flow diagram of at least one embodiment of a method for verifying a previously secured control transfer instruction as disclosed herein, which may be executed by the computing device of FIG. 1.
Figure 7:
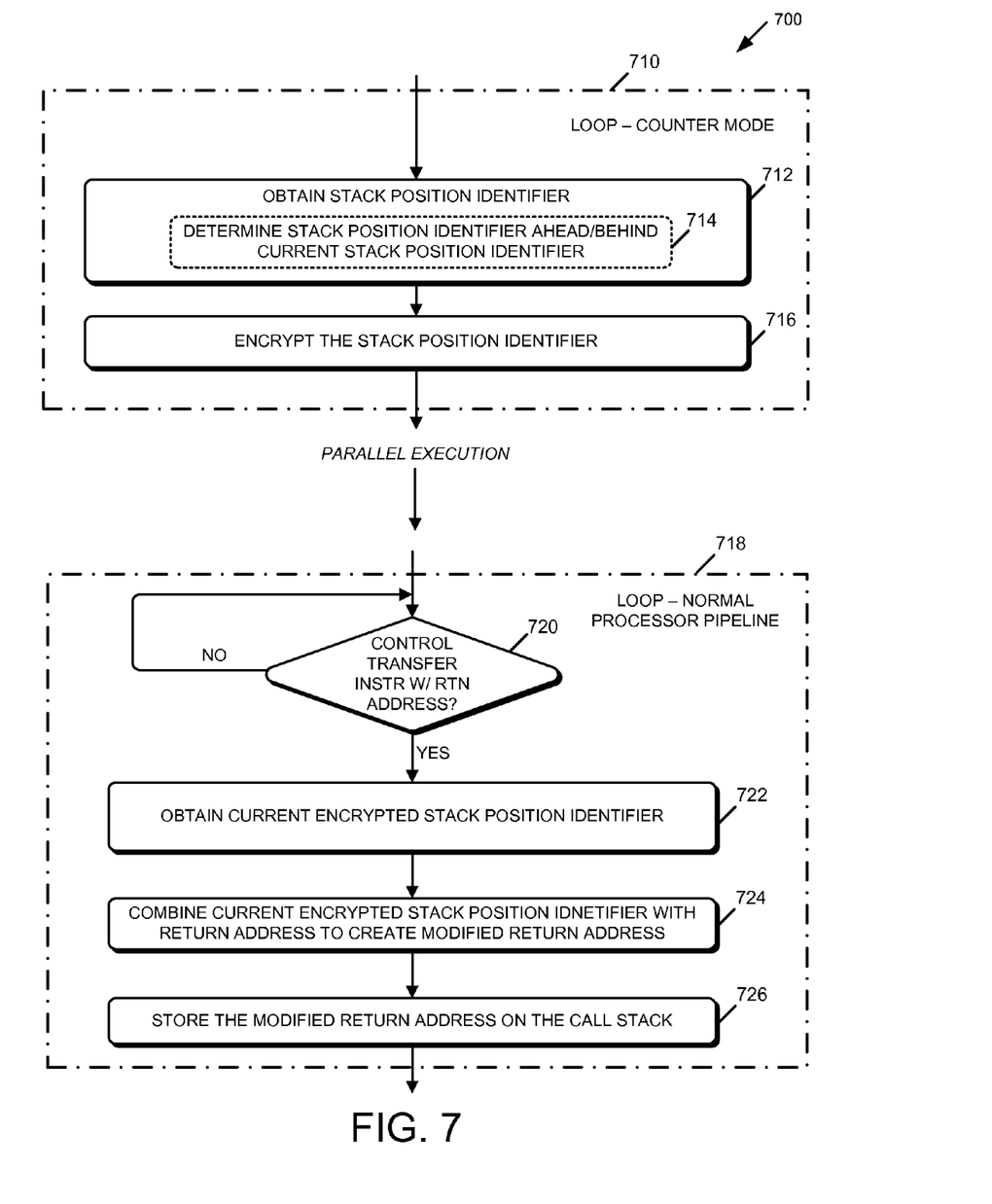
FIG. 7 is a simplified flow diagram of at least one embodiment of another method for providing security for a control transfer instruction as disclosed herein, which may be executed by the computing device of FIG. 1.

As discussed above, there are a number of different techniques that the secure control transfer instructions 104 can use to secure the return address 204 and verify the modified return address 206. In general, these various techniques generate security data using one or more stack position identifiers 114 and a secret key 116 as inputs to a cryptographic algorithm (e.g., cryptographic logic 138), and store the security data in a memory location that is readable by the processor 102. FIGS. 4 and 5, described below, relate to embodiments in which the return address is encrypted by a tweakable block cipher using the stack position identifier 114 as the tweak. FIG. 6, described below, relates to the disclosed technology for providing legacy code compatibility. FIG. 7, described below, relates to "counter mode" embodiments in which the return address is cryptographically combined with an encrypted stack position identifier 114. The counter mode embodiments can encrypt the stack position identifier in parallel with the processor's instruction processing pipeline, e.g., to avoid adding latency to the instruction pipeline due to the cryptographic operations.

Referring now to FIG. 4, an example of a method 400 for securing a return address is shown. Portions of the method 400 may be executed by hardware, firmware, and/or software of the computing device 100 (e.g., by the processor 102 executing the secure call logic 106 and portions of the return address security logic 136). At block 410, the computing device 100 determines whether a control transfer instruction containing a return address (e.g., as an argument), such as a subroutine call, has occurred during execution of a program by the computing device 100. If no control transfer instruction with a return address is encountered, the computing device 100 remains in block 410 and evaluates the next instruction. If a control transfer instruction with a return address is encountered, the computing device 100 pre-processes the return address as needed by the encryption algorithm being used to encrypt the return address, in block 412. The encryption algorithm may be selected according to the requirements of a particular design of the computing device 100; in the illustrated example, the encryption algorithm is a tweakable block cipher, such as XTS (XEX-based tweaked-codebook mode with ciphertext stealing), LRW (Liskov, Rivest, and Wagner), XEX (Xor Encrypt Xor), or the Intel Cascade Cipher in CTR-ECB mode. To pre-process the return address, the computing device 100 conforms the return address to the block size of the encryption algorithm. For example, the computing device 100 may normalize the return address so that all of the canonical bits of the return address fit within the block size of the tweakable cipher. In block 414, the computing device encrypts the return address using the secret key 116 and using the stack position identifier 114 as a tweak for the tweakable cipher. As used herein, a "tweak" may refer to, among other things, a second input to a block cipher, in addition to the usual plaintext or ciphertext input. The tweak, along with the secret key 116, selects the permutation that is computed by the cipher. In some embodiments, the stack position identifier 114 that is used by the encryption algorithm is the stack pointer (which points to the top of the call stack 218). Other embodiments may use counters that track the number of calls made minus the number of returns in a running program. Other embodiments may use a combination of these values. Portions of the return address that are not modified by encryption by a block cipher may also be used, possibly in combination with the previous examples, as a tweak to the cipher. In block 416, the computing device manipulates the encrypted return address output by block 414 so that the encrypted return address falls within an unused or non-canonical range. To do this, the computing device 100 sets the top bit of the return address to a value (e.g., 1) that will cause the address to fall within the unused/non-canonical range). In block 418, the computing device 100 stores the modified return address (e.g., the output of block 416) on the call stack (e.g., the call stack 218). In block 420, the computing device 100 reads the next instruction in the program sequence (e.g., the first instruction of the calling function), and returns to block 410.

Referring now to FIG. 5, an example of a method 500 for verifying a return address is shown. Portions of the method 500 may be executed by hardware, firmware, and/or software of the computing device 100 (e.g., by the processor 102 executing the secure return logic 108 and the portions of the return address security logic 136). In block 510, the computing device 100 determines whether a control transfer instruction that uses a return address (e.g., obtains the return address from the call stack 218), such as a return instruction, has occurred during execution of a program by the computing device 100. If no control transfer instruction that uses a return address obtained from the call stack 218 is encountered, the computing device 100 remains in block 510 and evaluates the next instruction. If a control transfer instruction that uses a return address obtained from the call stack 218 is encountered, the computing device 100 proceeds to block 512, where the computing device 100 obtains the return address from the top of the call stack 218. If the return address has previously been encrypted by, e.g., secure call logic 106 and return address security logic 136, the return address obtained by the computing device in block 512 is the modified return address (e.g., modified return address 206).

In block 514, the computing device 100 determines whether the return address obtained in block 512 falls within an unused or non-canonical range of memory addresses (where the unused/non-canonical range may be defined by, for example, the memory manager module 144). If the return address does not fall within an unused/non-canonical range, the computing device 100 proceeds to the top of the method 600 shown in FIG. 6, described below. If the return address falls within an unused/non-canonical range, the computing device decrypts the return address using the decryption algorithm counterpart of the encryption algorithm used in block 414 of FIG. 4, and using the stack position identifier 114 as a tweak. In block 518, the computing device restores the decrypted return address to its original, e.g., canonical, form. To do this, the computing device "reverses" the operation conducted in block 416 of FIG. 4. In block 520, the computing device 100 jumps to the instruction located at the return address of that has been decrypted and "restored" in blocks 516 and 518, respectively. In block 520, the computing device 100 jumps to the return address output by block 518, loads the instruction located at that address, and returns to block 510.

Referring now to FIG. 6, an example of a method 600 for handling return address faults is shown. Portions of the method 600 may be executed by hardware, firmware, and/or software of the computing device 100 (e.g., by the privileged system component 142 executing the return address fault handler module 148). In block 610, the computing device 100 determines whether a fault has occurred (e.g., a general protection fault or a page fault). In block 612, the computing device 100 determines whether the return address causing the fault is within the unused/non-canonical range of memory (where the unused/non-canonical range may be defined by, for example, the memory manager module 144). If the faulting address is not in the unused/non-canonical range, the computing device 100 treats the event as a "real" fault (e.g., page fault or general protection fault, as the case may be), in block 614 (which may cause the executing program to crash). If the faulting address is in the unused/non-canonical range, the computing device 100 decrypts the return address, using the decryption algorithm counterpart of the encryption algorithm used previously to encrypt the address, and using the stack position identifier as a tweak, in block 616. In block 618, the computing device 100 verifies that the decrypted return address is correct (e.g., the decrypted return address points to the next instruction after the call instruction), and/or verifies that the calling code is legitimate. If the computing device 100 successfully verifies the decrypted return address and/or the calling code in block 618, then in block 620, the computing device 100 transfers control to the instruction located at the verified return address. To do this, the computing device may issue an "iret" or interrupt return instruction. To perform the decrypting of the return address, the computing device 100 may obtain the secret key 116 from a memory location that is readable by the processor 102 or from a privileged handler, such as the privileged system component 142.

While not specifically shown in the drawings, it should be understood that the "iret" instruction and other similar instructions may also be modified to accept an encrypted return address from the stack and perform similar cryptographic operations as the return "ret" instruction described herein. In the case of iret instructions, interrupts and other asynchronous events causing program control flow that save the resumption state to the stack, including a return address for the "iret" instruction, will instead place on the stack the cryptographically modified version of the return address following logic similar to the "call" instruction described herein.

Referring now to FIG. 7, an example of another method 700 for securing a return address is shown. Portions of the method 700 may be executed by hardware, firmware, and/or software of the computing device 100 (e.g., by the processor 102 executing the secure call logic 106 and the return address security logic 136). The method 700 is an illustration of a "counter mode" embodiment of the secure call logic 106 and return address security logic 136. In the method 700, stack position identifiers 114 are encrypted in loop 710, while in loop 718, return addresses are encrypted or otherwise cryptographically combined with the encrypted stack position identifiers that are generated by the loop 710. The loops 710 and 718 can be executed in parallel by the processor 102 and a number of the resulting ciphertext can be stored in local registers, buffers or near memory. In the loop 710, one or more stack position identifiers 114 for the return addresses are obtained, in block 712. Illustratively, the stack position identifier 114 is the stack pointer (which points to the top of the call stack 218), such that the encryption of the stack position identifier 114 can be represented by: $k2=E_{k1}(SP)$, where k1 is the secret key 116, SP is the stack pointer, E is the encryption algorithm, and k2 is a secret key that is derived from k1 using the stack pointer. In the illustrated embodiment, E is a strong cryptographic algorithm such as AES. Other data or programming objects that can be used as the stack position identifiers 114 include the instruction pointer (also referred to as the program counter), a page identifier (e.g., a linear address of a page or a sub page of a fixed size) or stack frame identifier (which identifies a page, or a region of memory, referred to by the stack pointer), page size, and a tracking counter (which keeps track of the number of call instructions and/or the number of return instructions, during program execution). In some embodiments, in block 714, the computing device 100 predicts ahead or behind the current stack position identifier, so that these stack position identifiers can be calculated ahead of time and stored for low latency access by the processor.

In the loop 718, the computing device 100 determines whether a control transfer instruction including a return address (e.g., as an argument) is encountered. If a control transfer instruction including a return address is not encountered, the computing device remains in block 720 and reads the next instruction. If a control transfer instruction including a return address is encountered, in block 722 the computing device obtains the current encrypted stack position identifier, generated in block 716 of the loop 710. In block 724, the encrypted stack position identifier obtained in block 722 is combined with the return address to create a modified return address (e.g., the modified return address 206). To do this, the computing device 100 may use an XOR operation or a reduced round AES (Advanced Encryption Standard) or other appropriate block size cipher. In some embodiments, the computing device may use k2 to encrypt the return address (or a portion thereof) using, for example, a full or reduced round variant of a cipher such as SIMON, SPECK, or SERPENT. It should be noted that in any of the encryption techniques described herein, the entire return address does not need to be encrypted. For example, in some embodiments, only the top (most significant portion) of the address needs to be encrypted. Additionally, in embodiments in which the XOR is used to combine the return address with k2, not all address bits of the return address need to be modified (e.g., only the top 8 or 16 bits are XOR'd). Also, in some embodiments in which the AES algorithm is used to encrypt the return address, a portion of the plaintext return address and the stack pointer cipher text can be used to permute the AES block. Further, in some embodiments, the AES permutations may be performed before the return address is combined (e.g., XOR'd) with k2. Still further, AES permutations can be selected that can be achieved within one clock cycle. Even further, in some embodiments, multiple different stack position identifiers 114 can be used. For example, a stack page identifier and a call count (e.g., a count of the number of calls, which is incremented on a call instruction and decremented on a return instruction) can each be encrypted using, e.g., AES, and then combined with the return address (or a portion thereof) using, e.g., an XOR operation. The plaintext portion of the return address (e.g. the lower address bits) can be used as a selector to determine which bits of the encrypted counter output are selected to be combined with the upper return vector bits, making the selection dependent on the lower address bits. In this example, the XOR combination may be performed as part of a call instruction. Whatever the embodiment of return address security is used, the computing device performs the reverse operations (e.g., decrypts the return address) using the same technique, via the secure return logic 108. Moreover, it should be noted that not encrypting the lower address bits allows legacy programs to manipulate those bits. For example, a program may add an offset to a return address found on the stack to find relative program data (relative to the location of the call). By leaving this portion of the address (e.g., the lower address bits) unencrypted, a fault handler (triggered as a result of the upper bits corresponding to a non-canonical address as described herein) would be able to reverse the program's modifications and re-apply them to the real address yielding the relative offset to the intended data.

EXAMPLES

Illustrative examples of the technologies disclosed herein are provided below. An embodiment of the technologies may include any one or more, and any combination of, the examples described below.

Example 1 includes a computing device to secure return addresses to mitigate return oriented programming attacks. The computing device includes: a processor comprising call logic, wherein the call logic is to, prior to storage of a return address on a call stack, cause the processor to: read a secret key from a memory location of the computing device that is readable by the processor; determine a stack position identifier, the stack position identifier usable to determine a location on the call stack at which the return address is to be stored; generate security data by execution of a cryptographic algorithm with a plurality of inputs including: (i) the secret key and (ii) the stack position identifier, the output of the cryptographic algorithm being the security data; and store the security data in a memory location that is readable by the processor.

Example 2 includes the subject matter of Example 1, wherein the cryptographic algorithm includes an encryption algorithm, the plurality of inputs to the cryptographic algorithm further includes (iii) at least a portion of the return address, and the call logic is to execute the cryptographic algorithm with the stack position identifier as a tweak, such that the security data is a modified return address, and the call logic is to store the modified return address on the call stack.

Example 3 includes the subject matter of Example 1 or Example 2, wherein the cryptographic algorithm includes one or more of: an exclusive-or (XOR) operation, a reduced round cipher, and a full round cipher.

Example 4 includes the subject matter of Example 2, wherein the encryption algorithm includes a tweakable block cipher.

Example 5 includes the subject matter of Example 2, wherein the call logic is to further modify the modified return address by manipulation of at least a portion of the modified return address such that the further-modified return address falls within an unused range of memory addresses and store the further-modified return address on the call stack.

Example 6 includes the subject matter of Example 2, wherein the processor comprises return logic to, prior to return of program execution control to a return address on the call stack, cause the processor to: obtain the modified return address from the call stack; decrypt the encrypted portion of the return address by execution of a decryption algorithm with the stack position identifier as the tweak; and transfer program execution control to the address of the decrypted return address.

Example 7 includes the subject matter of Example 6, wherein the call logic is to further modify the modified return address by manipulation of the modified return address to fall within an unused range of memory addresses and store the further-modified return address on the call stack, and the return logic is to obtain the further-modified return address from the call stack, and manipulate the further-modified return address to restore the modified return address to its original format.

Example 8 includes the subject matter of Example 2, wherein the processor comprises return address descrambling logic to cause the processor to: determine if the modified return address has been modified to fall within an unused range of memory addresses; and if the modified return address has been modified to fall within an unused range of memory addresses, decrypt the encrypted portion of the return address by execution of a decryption algorithm with the stack position identifier as the tweak.

Example 9 includes the subject matter of Example 1 or Example 2, wherein the call logic is to cause the processor to: compute the security data by execution of a message authentication code algorithm, such that the security data includes a message authentication code; and store the security data in address bits that are within an unused range of memory addresses.

Example 10 includes the subject matter of Example 9, wherein the message authentication code algorithm includes a secure hash algorithm.

Example 11 includes the subject matter of Example 9, wherein the processor comprises return logic to, prior to return of program execution control to a return address on the call stack: obtain the message authentication code from the unusable memory location; obtain a current return address from the top of the call stack; compute second security data by execution of the message authentication code algorithm with (i) the secret key and (ii) the stack position identifier, as inputs; compare the second security data to the security data; and if the second security data and the security data match, transfer program execution control to the address of the current return address.

Example 12 includes the subject matter of Example 1 or Example 2, wherein the top of the call stack is indicated by a stack pointer, and the stack position identifier includes the stack pointer.

Example 13 includes the subject matter of Example 1 or Example 2, wherein a memory address of a currently executing instruction is indicated by an instruction pointer, and the stack position identifier includes the instruction pointer.

Example 14 includes the subject matter of Example 1 or Example 2, wherein the stack position identifier includes a page identifier representative of a range of memory addresses including the return address.

Example 15 includes the subject matter of Example 1 or Example 2, wherein the stack position identifier includes a tracking counter indicative of one or more of: a number of calls executed by the call logic and a number of returns executed by the return logic.

Example 16 includes the subject matter of Example 1 or Example 2, wherein the call logic is to encrypt at least a portion of the stack position identifier by execution of an encryption algorithm with the security key.

Example 17 includes the subject matter of Example 16, wherein the call logic is to modify the return address by combination of at least a portion of the return address with the encrypted stack position identifier.

Example 18 includes the subject matter of Example 17, wherein the call logic is to combine the return address with the encrypted stack position identifier by execution of an exclusive-or (XOR) operation, a reduced round cipher, or a full round cipher.

Example 19 includes the subject matter of Example 18, wherein the call logic is to: compute a predicted stack position identifier representing a range of memory addresses ahead or behind the range of memory addresses of the stack position identifier, and encrypt the predicted stack position identifier in parallel with the combination of the return address with the encrypted stack position identifier.

Example 20 includes a method for securing an address used by a processor of a computing device to control the flow of execution of a program, the method including: prior to storing an address on a stack: reading a secret key from a memory location of the computing device that is readable by the processor; determining a stack position identifier, the stack position identifier usable to determine a location on the stack at which the address is to be stored; generating security data by executing a cryptographic algorithm with a plurality of inputs including: (i) the secret key and (ii) the stack position identifier, the output of the cryptographic algorithm being the security data; and storing the security data in a memory location that is readable by the processor.

Example 21 includes the subject matter of Example 20, wherein the cryptographic algorithm includes an encryption algorithm, the plurality of inputs to the cryptographic algorithm further includes (iii) at least a portion of the address, and the method includes executing the cryptographic algorithm using the stack position identifier as a tweak, such that the security data is a modified address, and storing the modified address on the stack.

Example 22 includes the subject matter of Example 20, wherein the cryptographic algorithm includes one or more of: an exclusive-or (XOR) operation, a reduced round cipher, and a full round cipher.

Example 23 includes the subject matter of Example 21, wherein the encryption algorithm includes a tweakable block cipher.

Example 24 includes the subject matter of Example 21, including further modifying the modified address by manipulating at least a portion of the modified address such that the further-modified address falls within an unused range of memory addresses, and storing the further-modified address on the stack.

Example 25 includes the subject matter of Example 21, including, prior to directing program execution control to an address on the stack: obtaining the modified address from the stack; decrypting the encrypted portion of the address by executing a decryption algorithm using the stack position identifier as the tweak; and transferring program execution control to the address of the decrypted address.

Example 26 includes the subject matter of Example 25, including further modifying the modified address by manipulating the modified address to fall within an unused range of memory addresses, storing the further-modified address on the stack, obtaining the further-modified address from the stack, and manipulating the further-modified address to restore the modified address to its original format.

Example 27 includes the subject matter of Example 21, including: determining if the modified address has been modified to fall within an unused range of memory addresses; and if the modified address has been modified to fall within an unused range of memory addresses, decrypting the encrypted portion of the address by executing a decryption algorithm using the stack position identifier as the tweak.

Example 28 includes the subject matter of Example 20, including: computing the security data by executing a message authentication code algorithm, such that the security data includes a message authentication code; and storing the security data in an memory location that is within an unused range of memory addresses.

Example 29 includes the subject matter of Example 28, wherein the message authentication code algorithm includes a secure hash algorithm.

Example 30 includes the subject matter of Example 28, including, prior to directing program execution control to an address on the stack: obtaining the message authentication code from the unusable memory location; obtaining a current address from the top of the stack; computing second security data by executing the message authentication code algorithm with (i) the secret key and (ii) the stack position identifier, as inputs; comparing the second security data to the security data; and if the second security data and the security data match, transferring program execution control to the address of the current address.

Example 31 includes the subject matter of Example 20, wherein the top of the stack is indicated by a stack pointer, and the stack position identifier includes the stack pointer.

Example 32 includes the subject matter of Example 20, wherein a memory address of a currently executing instruction is indicated by an instruction pointer, and the stack position identifier includes the instruction pointer.

Example 33 includes the subject matter of Example 20, wherein the stack position identifier includes a page identifier representing a range of memory addresses including the address.

Example 34 includes the subject matter of Example 20, including encrypting at least a portion of the stack position identifier by executing an encryption algorithm with the security key.

Example 35 includes the subject matter of Example 34, including modifying the address by combining at least a portion of the address with the encrypted stack position identifier.

Example 36 includes the subject matter of Example 35, including combining the address with the encrypted stack position identifier using an exclusive-or (XOR) operation, a reduced round cipher, or a full round cipher.

Example 37 includes the subject matter of Example 36, including computing a predicted stack position identifier representing a range of memory addresses ahead or behind the range of memory addresses of the stack position identifier, and encrypting the predicted stack position identifier in parallel with the combining of the address with the encrypted stack position identifier.

An Example 38 includes one or more non-transitory machine readable storage media including a plurality of instructions stored thereon that in response to being executed result in a computing device performing the method of any of Examples 20-37.

An Example 39 includes a computing device including means for executing the method of any of Examples 20-37.

The invention claimed is:

1. A computing device to secure return addresses to mitigate return oriented programming attacks, the computing device comprising:
a processor comprising call logic,
wherein, prior to storage of a return address on a call stack, the call logic is to:
read a secret key from a memory location of the computing device that is readable by the processor;
determine a stack position identifier, the stack position identifier usable to determine a location on the call stack at which the return address is to be stored;
generate security data indicative of the return address by execution of a cryptographic algorithm such that the security data is based on both of: (i) the secret key and (ii) the stack position identifier;
modify the return address indicated in the security data to reference a non-canonical location in memory; and store the security data in a memory location that is readable by the processor.

2. The computing device of claim 1, wherein the stack position identifier comprises one of: a stack pointer indicative of the top of the stack, an instruction pointer indicative of a memory address of a currently executing instruction, a page identifier representative of a range of memory addresses including the address, and a tracking counter indicative of one or more of: a number of calls executed by the call logic and a number of returns executed by the return logic.

3. The computing device of claim 1, wherein the processor is further to:
determine whether the computing device is to enter a sleep mode;
transmit, in response to the determination that the computing device is to enter a sleep mode, the secret key to a remote device; and
restore the secret key from the remote device after the sleep mode has ended.

4. The computing device of claim 1, wherein the call logic is to:
compute the security data by execution of a message authentication code algorithm, such that the security data comprises a message authentication code; and
store the security data in address bits that are within an unused range of memory addresses.

5. The computing device of claim 4, wherein the processor comprises return logic and wherein, prior to return of program execution control to a return address on the call stack, the return logic is to:
obtain the message authentication code from the unusable memory location;
obtain a current return address from the top of the call stack;
compute second security data by execution of the message authentication code algorithm with (i) the secret key and (ii) the stack position identifier, as inputs;
compare the second security data to the security data; and
if the second security data and the security data match, transfer program execution control to the address of the current return address.

6. The computing device of claim 1, wherein the call logic is to encrypt at least a portion of the stack position identifier by execution of an encryption algorithm with the security key.

7. The computing device of claim 6, wherein the call logic is to modify the return address by combination of at least a portion of the return address with the encrypted stack position identifier.

8. The computing device of claim 7, wherein the call logic is to combine the return address with the encrypted stack position identifier by execution of an exclusive-or (XOR) operation, a reduced round cipher, or a full round cipher.

9. The computing device of claim 8, wherein the call logic is to: compute a predicted stack position identifier representative of a range of memory addresses ahead or behind the range of memory addresses of the stack position identifier, and encrypt the predicted stack position identifier in parallel with the combination of the return address with the encrypted stack position identifier.

10. The computing device of claim 1, wherein the cryptographic algorithm comprises an encryption algorithm, the plurality of inputs to the cryptographic algorithm further includes (iii) at least a portion of the return address, and the call logic is to execute the cryptographic algorithm with the stack position identifier as a tweak, and the call logic is to store the modified return address on the call stack.

11. The computing device of claim 10, wherein the processor comprises return address descrambling logic to:
   determine if the modified return address has been modified to fall within an unused range of memory addresses; and
   if the modified return address has been modified to fall within an unused range of memory addresses, decrypt the encrypted portion of the return address by execution of a decryption algorithm with the stack position identifier as the tweak.

12. The computing device of claim 10, wherein the encryption algorithm comprises a tweakable block cipher.

13. The computing device of claim 10, wherein the processor comprises return logic and wherein, prior to return of program execution control to a return address on the call stack, the return logic is to:
   obtain the modified return address from the call stack;
   decrypt the encrypted portion of the return address by execution of a decryption algorithm with the stack position identifier as the tweak; and
   transfer program execution control to the address of the decrypted return address.

14. The computing device of claim 13, wherein the return logic is to obtain the modified return address from the call stack, and manipulate the return address to restore the modified return address to its original format.

15. A method for securing an address used by a processor of a computing device to control the flow of execution of a program, the method comprising:
   prior to storing an address on a stack:
      reading a secret key from a memory location of the computing device that is readable by the processor;
      determining a stack position identifier, the stack position identifier usable to determine a location on the stack at which the address is to be stored;
      generating security data indicative of the address by executing a cryptographic algorithm such that the security data is based on both of: (i) the secret key and (ii) the stack position identifier;
      modifying the address indicated in the security data to reference a non-canonical location in memory; and
      storing the security data in a memory location that is readable by the processor.

16. The method of claim 15, wherein the cryptographic algorithm comprises an encryption algorithm, the plurality of inputs to the cryptographic algorithm further includes (iii) at least a portion of the address, and the method comprises executing the cryptographic algorithm using the stack position identifier as a tweak, and storing the modified address on the stack.

17. The method of claim 15, comprising, prior to directing program execution control to an address on the stack:
   obtaining the modified address from the stack;
   manipulating the modified address to restore the modified address to its original format.

18. One or more non-transitory machine readable storage media comprising a plurality of instructions stored thereon that in response to being executed result in a computing device securing an address used by a processor of a computing device to control the flow of execution of a program, by:
   prior to storing an address on a stack:
      reading a secret key from a memory location of the computing device that is readable by the processor;
      determining a stack position identifier, the stack position identifier usable to determine a location on the stack at which the address is to be stored;
      generating security data indicative of the return address by executing a cryptographic algorithm such that the security data is based on both of: (i) the secret key and (ii) the stack position identifier;
      modifying the return address indicated in the security data to reference a non-canonical location in memory; and
      storing the security data in a memory location that is readable by the processor.

19. The one or more non-transitory machine readable storage media of claim 18, wherein the cryptographic algorithm comprises an encryption algorithm, the plurality of inputs to the cryptographic algorithm further includes (iii) at least a portion of the address, and the instructions result in the computing device executing the cryptographic algorithm using the stack position identifier as a tweak, and storing the modified address on the stack.

20. The one or more non-transitory machine readable storage media of claim 18, wherein the instructions result in the computing device:
   computing the security data by executing a message authentication code algorithm, such that the security data comprises a message authentication code; and
   storing the security data in a memory location that is within an unused range of memory addresses.

21. The one or more non-transitory machine readable storage media of claim 18, wherein the instructions result in the computing device computing a predicted stack position identifier representing a range of memory addresses ahead or behind a range of memory addresses of the stack position identifier, and encrypting the predicted stack position identifier in parallel with the combining of the address with the encrypted stack position identifier.

22. The one or more non-transitory machine readable storage media of claim 18, wherein the instructions result in the computing device, prior to directing program execution control to an address on the stack:
   obtaining the modified address from the stack;
   manipulating the modified address to restore the modified address to its original format.

23. The one or more non-transitory machine readable storage media of claim 22, wherein the instructions result in the computing device:
   determining if the modified address has been modified to fall within an unused range of memory addresses; and
   if the modified address has been modified to fall within an unused range of memory addresses, decrypting the encrypted portion of the address by executing a decryption algorithm using the stack position identifier as the tweak.

* * * * *